(12) United States Patent
Frost et al.

(10) Patent No.: US 11,952,124 B2
(45) Date of Patent: Apr. 9, 2024

(54) AIRCRAFT TRAY TABLE WITH MAGNIFICATION LENS

(71) Applicant: B/E Aerospace, Inc., Winston-Salem, NC (US)

(72) Inventors: Ian L. Frost, Winston-Salem, NC (US); Daniel I. Udriste, Winston-Salem, NC (US); Charles Zurian, Kernersville, NC (US); Mark Vaughan, Winston-Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 385 days.

(21) Appl. No.: 17/238,011

(22) Filed: Apr. 22, 2021

(65) Prior Publication Data
US 2021/0339870 A1 Nov. 4, 2021

Related U.S. Application Data

(60) Provisional application No. 63/018,329, filed on Apr. 30, 2020.

(51) Int. Cl.
*B64D 11/06* (2006.01)
*B64D 11/00* (2006.01)

(52) U.S. Cl.
CPC .... *B64D 11/0638* (2014.12); *B64D 11/00152* (2014.12)

(58) Field of Classification Search
CPC ............ B64D 11/0015; B64D 11/0605; B64D 11/0638; B64D 11/00152; B60N 3/001;
(Continued)

(56) References Cited

U.S. PATENT DOCUMENTS

| 4,630,821 A | 12/1986 | Greenwald |
| 6,822,812 B1 | 11/2004 | Brauer |

(Continued)

FOREIGN PATENT DOCUMENTS

| AU | 2013101111 A4 | 9/2013 |
| CN | 103188359 A | 7/2013 |

(Continued)

OTHER PUBLICATIONS

"Acutty 12" Screen Magnifier for Smartphone Thin Foldable Mobile Phone Screen Amplifier HD Folding Stand Bracket Mobile Phone 3D Magnifier Projector Screen for Movies, Videos, and Gaming Amazon.fr: High-Tech 11, Jan. 21, 2020 (Jan. 21, 2020), XP055834708, Retrieved from the Internet: (Year: 2020) URL: <https://www.amazon.fr/Acutty-Magnifier-Smartphone-Amplifier-Projector/dp/B0842NY4RR/ref=sr19?adgrpid=66206462393&dchild=1&gclid=EATaTQobChMitO c9dTL8glViAZ7Ch0w7Af-EAMYASAAEglUUDBwE&hvadid=323601242852&hvdev=c&hvlocphy=9040856&hvnetw=g&thmt=b& (Year: 2020) hvrand=3958175383731918037&hvtargid=kwd-29 6113274827> [retrieved on Aug. 25, 2021] (Year: 2020).*

(Continued)

*Primary Examiner* — Richard Green
*Assistant Examiner* — Michael A. Fabula
(74) *Attorney, Agent, or Firm* — Suiter Swantz pc llo

(57) ABSTRACT

An aircraft tray table may include a body with a defined interior cavity, a personal electronic device support, and a magnification lens. The personal electronic device support may be configured to hold a personal electronic device when the personal electronic device support is in a support deployed position. The magnification lens may be configured to fit within the interior cavity when the magnification lens is in a lens stowed position. The magnification lens may include a lens configured to magnify content displayed on (Continued)

the personal electronic device held by the personal electronic device support when the magnification lens is in a lens deployed position. The personal electronic device support may be parallel to the magnification lens when the personal electronic device is in the support deployed position and the magnification lens is in the lens deployed position.

9 Claims, 16 Drawing Sheets

(58) Field of Classification Search
CPC ...... B60N 3/002; B60N 3/004; G02B 25/002; G02B 25/005; G02B 27/027; H04M 1/027
See application file for complete search history.

(56) References Cited

U.S. PATENT DOCUMENTS

| | | | | |
|---|---|---|---|---|
| 7,286,306 | B2* | 10/2007 | Wu | G02B 27/026 248/172 |
| 8,520,370 | B2* | 8/2013 | Waitzman, III | G02B 27/04 381/345 |
| 2003/0233659 | A1* | 12/2003 | Guerin | B60N 3/004 725/77 |
| 2005/0178297 | A1* | 8/2005 | Pipkin | A47B 23/00 108/44 |
| 2007/0283855 | A1* | 12/2007 | Pozzi | A47B 23/043 108/44 |
| 2011/0216483 | A1* | 9/2011 | Vesely | G06F 1/1624 361/679.01 |
| 2016/0039525 | A1* | 2/2016 | Pajic | B60N 3/004 108/44 |
| 2017/0166141 | A1* | 6/2017 | Pajic | B64D 11/0638 |
| 2020/0017220 | A1* | 1/2020 | Wanner | F16M 13/022 |
| 2021/0217384 | A1* | 7/2021 | Lin | H04N 9/3188 |

FOREIGN PATENT DOCUMENTS

| | | |
|---|---|---|
| CN | 203859794 U | 10/2014 |
| CN | 104391422 A | 3/2015 |
| CN | 104714356 B | 8/2016 |
| CN | 205754484 U | 11/2016 |
| CN | 106790777 A | 5/2017 |
| CN | 107045375 A | 8/2017 |
| CN | 108072974 A | 5/2018 |
| DE | 102009031235 B3 | 12/2010 |
| JP | 2002368854 A | 12/2002 |
| JP | 2004347823 A | 12/2004 |
| JP | 2014026012 A | 2/2014 |

OTHER PUBLICATIONS

Peedeu Loupe D'ecran de Teiephone,3D Screen Magnifier de 12 Pouces avec Support de Piiable Portable,Angle et Distance Reglables, Ampificateur de Film pour Tous Les Smartphones : Amazon.fr: High-Tech 11, Nov. 7, 2019 (Nov. 7, 2019), XP055834711, Retrieved from the Internet: (Year: 2019) URL: <https://www.amazon.fr/Peedeu-Telephone -Magnifier-Amplificateur-Smartphones/dp/B07YYX5Wll/ref=sr117?adgrpid=66206462393&dchlid=l&gclid=EAialQobChMitOc9dTL8glViAZ7Ch0w7Af-EAMYASAAEgIUUD BwE&hvadid=323601242852&hvdev=c&hvlocphy=9040856&hvnetw=g&thqmt=b&hvrand= (Year: 2019) 3958175383731918037&hvtargid=kwd-296113>[retrieved on Aug. 25, 2021] (Year: 2019).*
"Volwco 12 inch Phone Screen Magnifier,2019 Upgraded 3D phone Screen Enlarger with Foldable HolderStand.Anti-radiation Eye Protection HD Movie Video Screen Amplifier for All Smartphones : Amazon.co.uk: Electronics & Photo", Oct. 3, 2019 (Oct. 3, 2019), XP055834327,Retrieved from the Internet: URL:https://www.amazon.co.uk/Volwco-Magnif ier-Anti-radiation-Protection-Smartphones/dp/B07YNL6F5R?th=l [retrieved on Aug. 24, 2021].
Extended Search Report for European Application No. 21171592.5 dated Sep. 10, 2021, 12 pages.
E-Tay Industrial Co. Ltd., URL: https://www.mymagnifier.com/en/category/Screen-Magnifier/CAT-Screen-Magnifier.html, Screen Magnifier, Downloaded Mar. 2, 2020, 5 pages.

* cited by examiner

AIRCRAFT TRAY TABLE WITH MAGNIFICATION LENS

CROSS-REFERENCE TO RELATED APPLICATIONS

The present application is related to and claims benefit of the earliest available effective filing date from the following applications: the present application claims the benefit of U.S. Provisional Application Ser. No. 63/018,329, filed Apr. 30, 2020, which is incorporated herein by reference in the entirety.

BACKGROUND

An aircraft passenger may desire to use their personal electronic device during a flight. The personal electronic device may need to be set up to free the aircraft passenger's hands for other uses. In addition, the personal electronic device may need to be set up at a distance from the aircraft passenger that results in a limited ability by the aircraft passenger to view the content displayed on the personal electronic device.

SUMMARY

An aircraft tray table is disclosed, in accordance with one or more embodiments of the disclosure. The aircraft tray table may include a body with a defined interior cavity. The aircraft tray table may include a personal electronic device support coupled to the body. The personal electronic device support may be configured to be actuated between a support stowed position and a support deployed position via one or more support hinges. The personal electronic device support may be configured to hold a personal electronic device when the personal electronic device support is in the support deployed position. The aircraft tray table may include a magnification lens configured to actuate between a lens stowed position, an intermediate lens deployed position, and a final lens deployed position. The magnification lens may be configured to fit within the interior cavity when the magnification lens is in the lens stowed position. The magnification lens may include a lens configured to magnify content displayed on the personal electronic device when the magnification lens is in the final lens deployed position. The aircraft tray table may include a lens actuation assembly within the interior cavity. The lens actuation assembly may include one or more carriages coupled to one or more rails. The one or more carriages may be configured to actuate the magnification lens along the one or more rails between the lens stowed position and the intermediate lens deployed position. The lens actuation assembly may include one or more lens hinges coupled to the one or more carriages. The one or more lens hinges may be configured to actuate the lens between the intermediate lens deployed position and the final lens deployed position. The personal electronic device support may be set at a first angle relative to a surface of the body when the personal electronic device support is in the support deployed position. The magnification lens may be set at a second angle relative to the surface of the body when the magnification lens is in the lens deployed position. The first angle and the second angle may be selected so the personal electronic device support and the magnification lens are parallel.

In some embodiments, the aircraft tray table may include one or more tray hinges configured to couple to one or more mount points integrated within a rear surface of the body.

In some embodiments, the aircraft tray table may be configured to rotate between a tray table stowed position and a tray table deployed position about an axis through the one or more tray hinges.

In some embodiments, the aircraft tray table may be configured to rotate between a horizontal deployed position and an angled deployed position about an axis through the one or more tray hinges.

In some embodiments, the one or more tray hinges may include at least one toggle configured to allow for a rotation about an axis through the one or more tray hinges.

In some embodiments, the aircraft tray table may include one or more lock detents configured to hold the aircraft tray table in the tray table stowed position.

In some embodiments, the one or more lock detents may be set within an exterior surface of the magnification lens.

In some embodiments, the magnification lens may include a lens frame configured to hold the lens. The one or more lens hinges may be coupled to the lens frame.

In some embodiments, the one or more lock detents may be set within an exterior surface of a lens frame member.

In some embodiments, the one or more carriages may include two carriages. The lens actuation assembly may include a linkage coupled to the two carriages. The linkage may be configured to cause the two carriages to actuate simultaneously when the magnification lens is actuated between the lens stowed position and the intermediate lens deployed position.

In some embodiments, the personal electronic device support may be configured to fit within an indentation in the surface of the body when the personal electronic device support is in the support stowed position.

In some embodiments, a surface of the personal electronic device support may be flush with the surface of the body when the personal electronic device support is in the support stowed position.

In some embodiments, a centroid of the magnification lens and a centroid of the personal electronic device may be aligned when the magnification lens is in the final lens deployed position and the personal electronic device is held by the personal electronic device support when the personal electronic device support is in the support deployed position.

In some embodiments, an amount of magnification of the content displayed on the personal electronic device when the magnification lens is in the final lens deployed position may be dependent on a distance between the personal electronic device support and the magnification lens.

An aircraft tray table is disclosed, in accordance with one or more embodiments of the disclosure. The aircraft tray table may include a body with a defined interior cavity. The aircraft tray table may include a personal electronic device support coupled to the body. The personal electronic device support may be configured for a support stowed position and for a support deployed position. The personal electronic device support may be configured to hold a personal electronic device when the personal electronic device support is in the support deployed position. The aircraft tray table may include a magnification lens configured for a lens stowed position and a lens deployed position. The magnification lens may be configured to fit within the interior cavity when the magnification lens is in the lens stowed position. The magnification lens may include a lens configured to magnify content displayed on the personal electronic device held by the personal electronic device support when the magnification lens is in the lens deployed position. The personal electronic device support may be set at a first angle relative to a surface of the body when the personal electronic device support is in the support deployed position. The magnification lens may be set at a second angle relative to the surface of the body when the magnification lens is in the lens deployed position. The first angle and the second angle may be selected so the personal electronic device support and the magnification lens are parallel.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

DETAILED DESCRIPTION OF THE INVENTION

Figure 1:
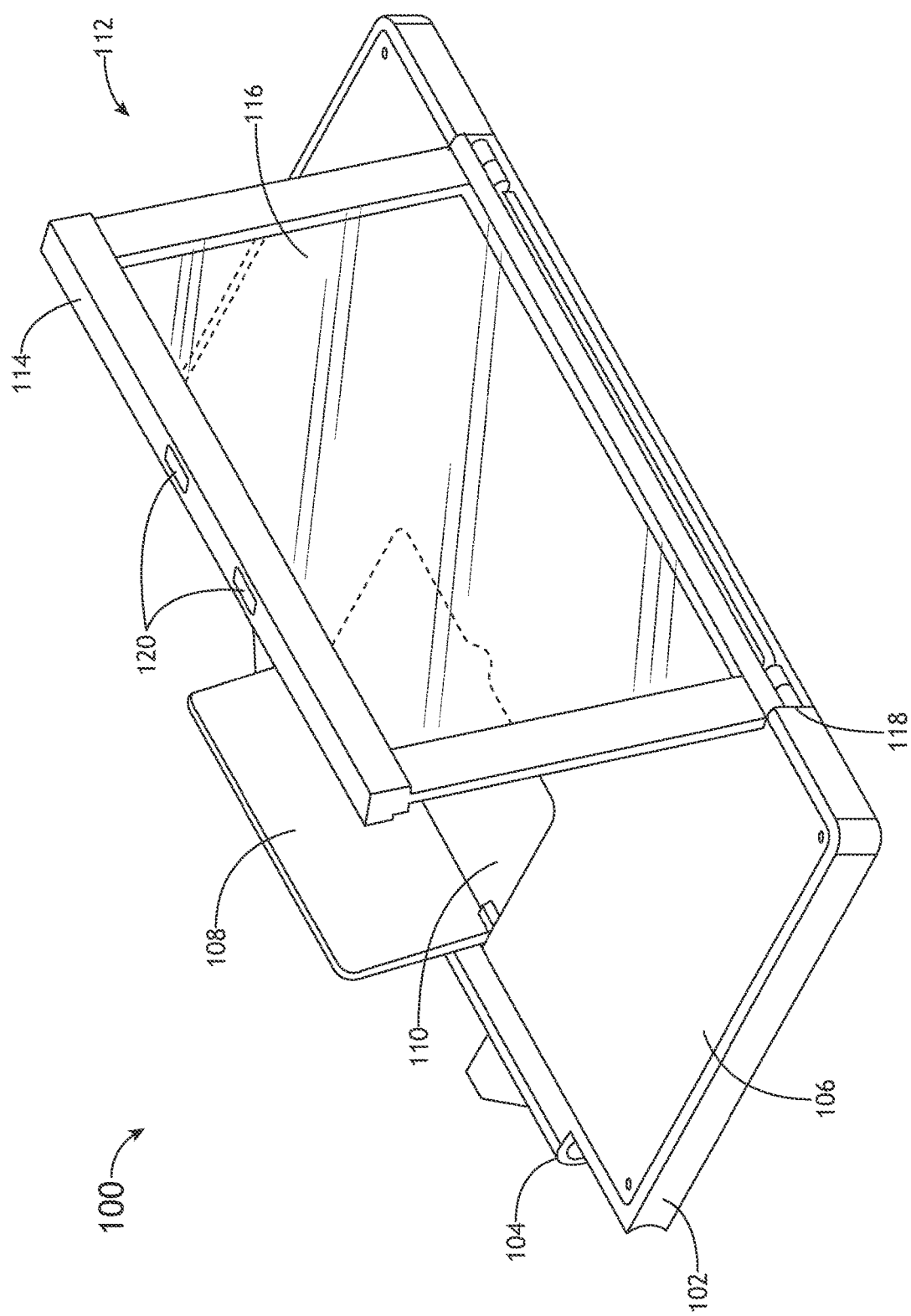
FIG. 1 illustrates a perspective view of an aircraft tray table with a magnification lens, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1-8D in general illustrate an aircraft tray table with a magnification lens, in accordance with one or more embodiments of the disclosure.

An aircraft passenger may desire to use their personal electronic device (PED) during a flight. The personal electronic device may need to be supported to free the aircraft passenger's hands for other uses. For example, the personal electronic device may be propped up on an aircraft tray table against an adjacent aircraft seat, against a class divider, against an aircraft monument, or against some other surface within an aircraft cabin.

In addition, the personal electronic device may need to be set up at a distance from the aircraft passenger. The distance may result in a limited ability by the aircraft passenger to view the content displayed on the personal electronic device due to the size of the personal electronic device. For example, where the personal electronic device is a smartphone or tablet, the distance between the personal electronic device and the aircraft passenger may make the contact displayed on the personal electronic device too small to read. By way of another example, the orientation of the personal electronic device while being supported may result in a difficult viewing angle for the aircraft passenger.

Therefore, it would be desirable to provide an aircraft tray table capable of supporting the personal electronic device. The aircraft tray table should increase the size of the content being displayed on the personal electronic device for easier viewing by the aircraft passenger. The personal electronic device should be supported at a select viewing angle when the size of the content being displayed on the personal electronic device is increased for easier viewing by the aircraft passenger.

FIG. 1 illustrates an aircraft tray table 100, in accordance with one or more embodiments of the disclosure. It is noted herein that the term "aircraft tray table" and variants of the term "aircraft tray table" (e.g., "tray table," or the like) may be considered equivalent for purposes of the present disclosure.

The tray table 100 may include a body 102. The body 102 may include one or more mount points 104. For example, the one or more mount points 104 may be coupled to or integrated within a rear surface of the body 102. The tray table 100 may be configured to couple to a component (e.g., a hinge, a tray arm or a linkage of a tray arm assembly, or the like) via the one or more mount points 104 to install the tray table 100 within an aircraft cabin.

The body 102 may include a top plate and a bottom plate. The top plate may include a surface 106 usable by an aircraft passenger. For example, the surface 106 may be a top surface of the top plate. For instance, the top plate may include an indentation for cups, bottles, or other containers. The surface 106 may include a non-slip laminate or coating.

Although embodiments of the disclosure illustrate the body 102 including the top plate and the bottom plate, it is noted herein the body 102 may be manufactured (e.g., injection-molded, additive manufactured, or the like) as a single component. Therefore, the above description should not be interpreted as a limitation on the scope of the disclosure but merely an illustration.

The tray table 100 may include a personal electronic device support 108 (PED support 108). The PED support 108 may be configured to rotate between a support deployed position and a support stowed position. The PED support 108 may be configured to hold a personal electronic device when the PED support 108 is in the support deployed position. The PED support 108 may be configured to fit within an indentation 110 set within the thickness of the body 102 when in the support stowed position. For example, a back or rear surface of the PED support 108 may be flush with the surface 106 of the top plate when the PED support 108 rests within the indentation 110 when in the support stowed position.

The tray table 100 may include a magnification lens 112. The magnification lens 112 may be configured to actuate between a lens stowed position and one or more lens deployed positions. For example, the one or more lens deployed positions may include, but are not limited to, a retracted or intermediate lens deployed position. By way of another example, the one or more lens deployed positions may include, but are not limited to, an extended or final lens deployed position.

The magnification lens 112 may include a lens frame 114. The lens frame 114 may be constructed from one or more lens frame members.

The magnification lens 112 may include a lens element 116. For example, the lens element 116 may include, but is not limited to, a Fresnel lens. In general, the lens element 116 may be dimensioned to provide a 2× to 5× magnification of content displayed on a personal electronic device set on the PED support 108 when the PED support 108 is in the support deployed position.

The lens frame 114 may be configured to hold the lens element 116. For example, where there are multiple lens frame members, the lens element 116 may be held in place via the combining of the multiple lens frame members. By way of another example, the lens element 116 may be press-fit into the lens frame 114.

The tray table 100 may include a cut-out 118 within the top plate and/or the bottom plate of the body 102. For example, the cut-out 118 may be entirely within the top plate. By way of another example, the cut-out 118 may be within both the top plate and the bottom plate. By way of another example, the cut-out 118 may be entirely within the bottom plate. The magnification lens 112 may be configured to pass through the cut-out 118 when actuating between the lens stowed position and the one or more lens deployed positions. A surface of the magnification lens 112 may be flush with a surface of the top plate, a surface of the bottom plate, and/or a surface of the body 102 when the magnification lens 112 is in the lens stowed position.

The tray table 100 may include one or more lock detents 120 within a surface. For example, the one or more lock detents 120 may be positioned within a surface of a frame member of the lens frame 114 of the magnification lens 112. By way of another example, the one or more lock detents 120 may be positioned within a surface of the top plate, a surface of the bottom plate, and/or a surface of the body 102. The one or more lock detents 120 may be configured to hold the tray table 100 within a tray table stowed position.

Figure 2:
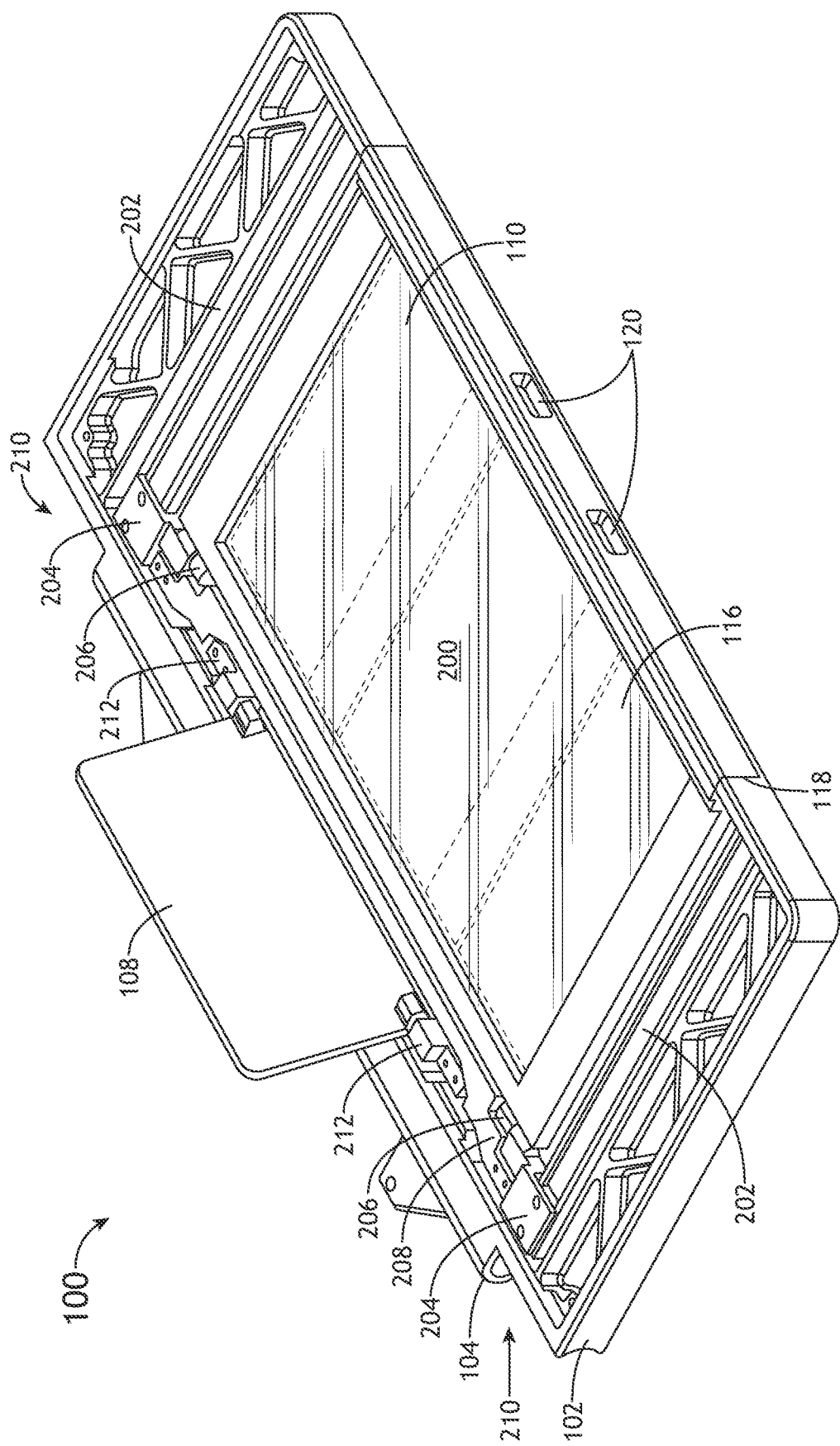
FIG. 2 illustrates a perspective view of an interior cavity of an aircraft tray table with a magnification lens, in accordance with one or more embodiments of the disclosure.

FIG. 2 illustrates an interior cavity 200 of the aircraft tray table 100, in accordance with one or more embodiments of the disclosure.

The interior cavity 200 may be defined within the body 102 and the surface 106. It is noted herein the surface 106 has been removed from FIG. 2 for ease of viewing interior components installed or housed within the interior cavity 200. In addition, it is noted herein the tray table 100 may include a support plate positioned within the body 102 and configured to support the top plate, which has been removed from FIG. 2 for ease of illustration of interior components installed within the interior cavity 200.

The tray table 100 may include one or more rails 202 within the interior cavity 200. The tray table 100 may include one or more carriages 204, where each carriage 204 may correspond to a rail 202. For example, the one or more carriages 204 may be configured to actuate along the one or more rails 202.

The one or more carriages 204 may be coupled to the magnification lens 112 via one or more lens hinges 206. For example, the one or more lens hinges 206 may include, but are not limited to, friction hinges, self-closing hinges, spring-loaded hinges, or other hinges. The one or more lens hinges 206 may be coupled to a frame member of the lens frame 114 of the magnification lens 112. It is noted herein, however, that the one or more lens hinges 206 may be coupled to the lens element 116, such that the magnification lens 112 may not include the lens frame 114.

The tray table 100 may include a cradle or linkage 208. The cradle or linkage 208 may be coupled to the one or more carriages 204. For example, where there are multiple carriages 204 (and multiple rails 202), the cradle or linkage 208 may connect or distribute the actuation between the carriages 204. Although embodiments of the disclosure illustrate the one or more lens hinges 206 being coupled to the one or more carriages 204, it is noted herein the one or more lens hinges 206 may be coupled to the cradle or linkage 208 instead of to the one or more carriages 204 (e.g., the one or more carriages 204 and the one or more lens hinges 206 are each coupled to the cradle or linkage 208). Therefore, the above description should not be interpreted as a limitation on the scope of the disclosure but merely an illustration.

The tray table 100 may include a lens actuation assembly 210. It is noted herein that all or some combination of the one or more rails 202, the one or more carriages 204, the one or more lens hinges 206, and/or the cradle or linkage 208 may be considered components of the lens actuation assembly 210, for purposes of the disclosure.

It is noted herein the lens actuation assembly 210 may include a second set of rails and carriages configured to raise or lower the magnification lens 112 following a rotation of the magnification lens about the axis through the one or more lens hinges 206. Therefore, the above description should not be interpreted as a limitation on the scope of the disclosure but merely an illustration.

The tray table 100 may include one or more personal electronic device support hinges 212 (PED support hinges 212). For example, the one or more PED support hinges 212 may include, but are not limited to, friction hinges, self-closing hinges, spring-loaded hinges, or other hinges. The PED support 108 may be configured to rotate between the support stowed position and the support deployed position via the one or more PED support hinges 212.

Although embodiments of the disclosure illustrate the use of the one or more lens hinges 206 and the one or more PED support hinges 212, it is noted herein the one or more lens hinges 206 and/or the one or more PED support hinges 212 may be removed from the tray table 100. Here, the corresponding PED support 108 or the magnification lens 112 may be stowed in/on the body 102 and manually installed by a passenger in respective deployed positions within grooves in the body 102 (e.g., in the surface 106 of the body 102). Therefore, the above description should not be interpreted as a limitation on the scope of the disclosure but merely an illustration.

It is noted herein that components within the interior cavity 200 and/or other areas of the tray table 100 (e.g., tray arm channels, tray hinge mount points, or the like) may need to be re-arranged, re-designed, and/or otherwise reconfigured to provide enough room for the magnification lens 112 to fit within the interior cavity 200. In this regard, fitting the tray table 100 with the magnification lens 112 may require more than just fabricating the body 102 to include the interior cavity 200, the cut-out 118, or other areas configured to receive the magnification lens 112.

FIGS. 3A-3D and FIGS. 4A-4D illustrate perspective and side views of components of the tray table 100 in various states of actuation from respective stowed positions to deployed positions, in accordance with one or more embodiments of the disclosure.

Figure 3A:
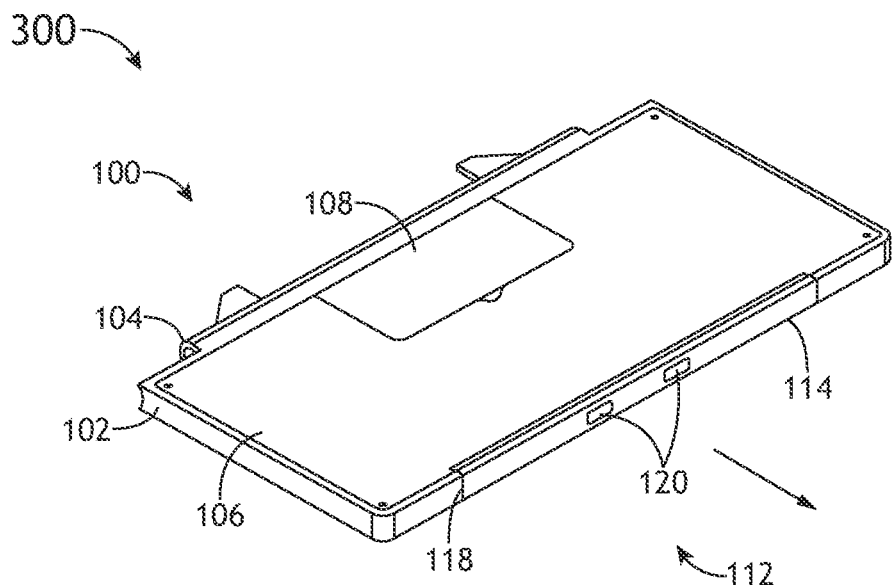
FIG. 3A illustrates a perspective view of an aircraft tray table with a magnification lens, in accordance with one or more embodiments of the disclosure.
Figure 4A:
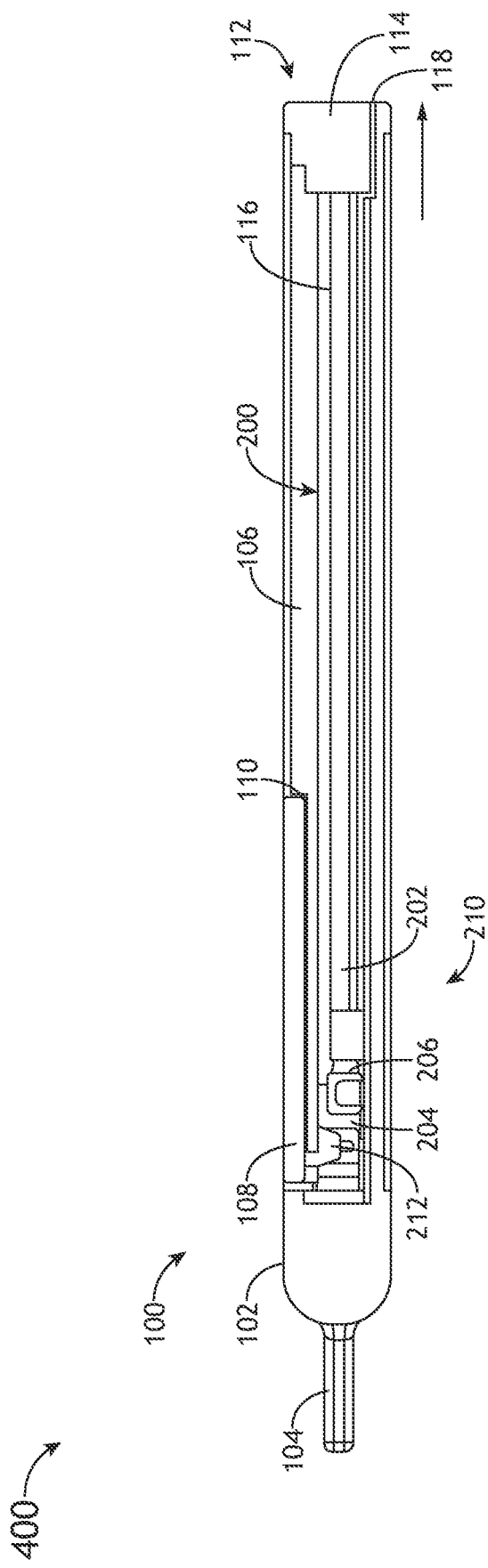
FIG. 4A illustrates a side view of an aircraft tray table with a magnification lens, in accordance with one or more embodiments of the disclosure.

In state 300 as illustrated in FIG. 3A and state 400 as illustrated in FIG. 4A, the PED support 108 may be in the support stowed position and the magnification lens 112 may be in the lens stowed position.

The lens element 116 may be dimensioned to allow the magnification lens 112 to fit within the interior cavity 200 when in the lens stowed position. In one non-limiting example, the lens element 116 may have a diagonal length of 12 inches. In another non-limiting example, the lens element 116 may be 7 inches tall by 10.25 inches wide. It is noted herein, however, that the dimensions of the lens element 116 may be dependent on dimensions of the tray table 100 and/or of the aircraft in which the magnification lens 112 may be installed including, but not limited to, interior cavity 200 dimensions, distance between a personal electronic device and/or the magnification lens 112 and an aircraft passenger, or other dimensions. Therefore, the above description should not be interpreted as a limitation on the scope of the disclosure but merely an illustration.

Figure 3B:
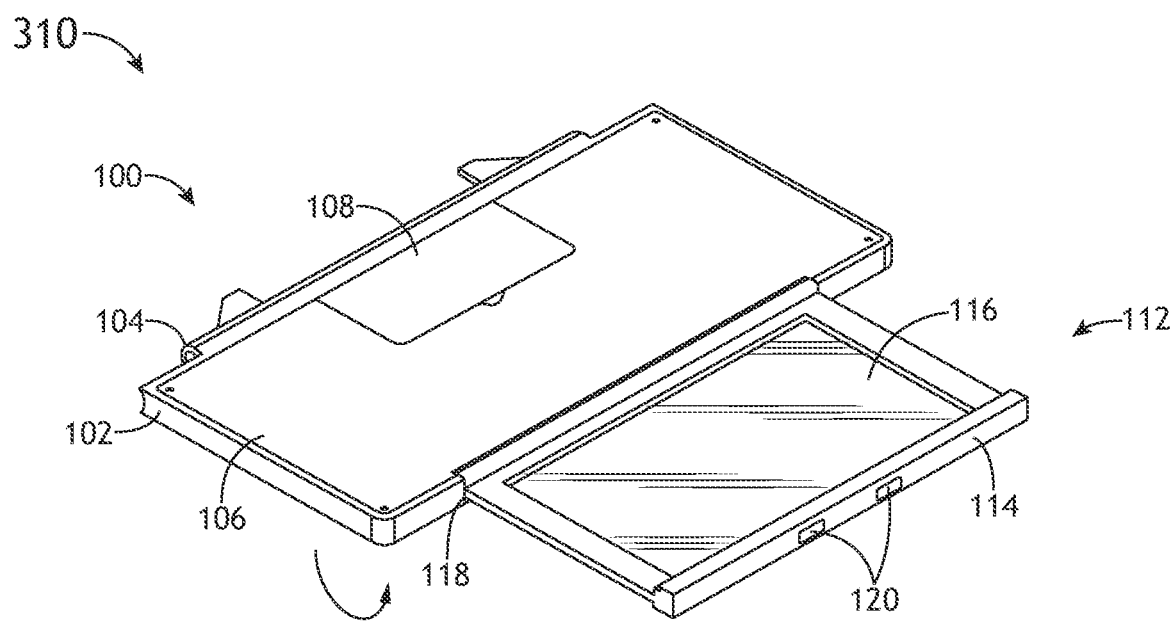
FIG. 3B illustrates a perspective view of an aircraft tray table with a magnification lens, in accordance with one or more embodiments of the disclosure.
Figure 4B:
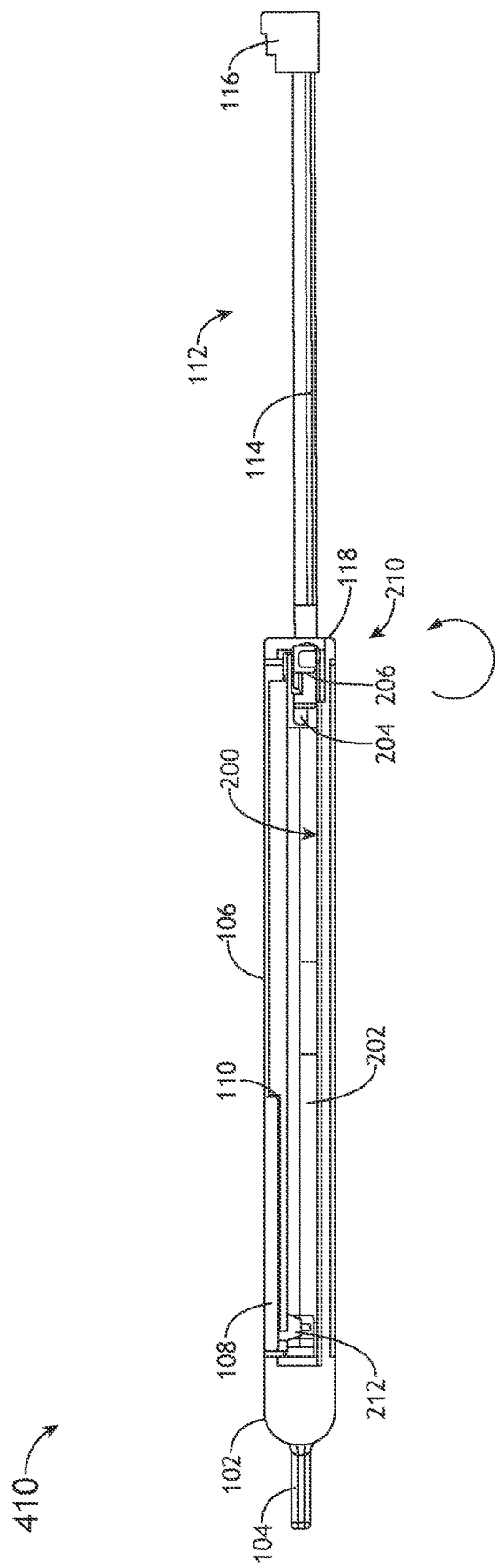
FIG. 4B illustrates a side view of an aircraft tray table with a magnification lens, in accordance with one or more embodiments of the disclosure.

In a state 310 as illustrated in FIG. 3B and a state 410 as illustrated in FIG. 4B, the PED support 108 may be in the support stowed position and the magnification lens 112 may be in an intermediate lens deployed position.

The magnification lens 112 may actuate between the lens stowed position and the intermediate lens deployed position. For example, the magnification lens 112 may translate along the one or more rails 202 via the one or more carriages 204 (and the linkage 208, where there are multiple carriages 204) between the lens stowed position and the intermediate lens deployed position.

In one non-limiting example, the magnification lens 112 may translate 7 inches along the one or more rails 202 via the one or more carriages 204. It is noted herein, however, that the distance of translation may be dependent on dimensions of the tray table 100 and/or the aircraft in which the magnification lens 112 may be installed. Therefore, the above description should not be interpreted as a limitation on the scope of the disclosure but merely an illustration.

Figure 3C:
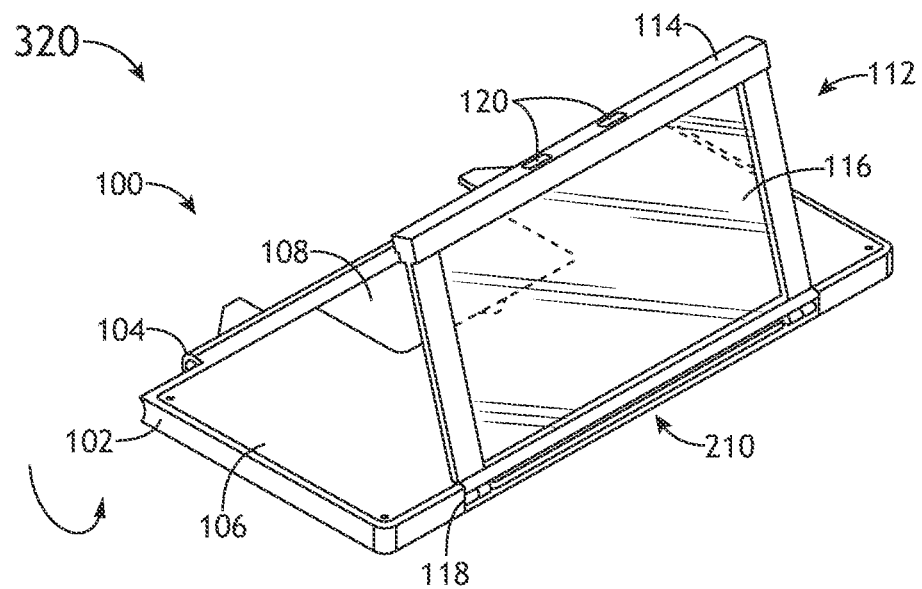
FIG. 3C illustrates a perspective view of an aircraft tray table with a magnification lens, in accordance with one or more embodiments of the disclosure.
Figure 4C:
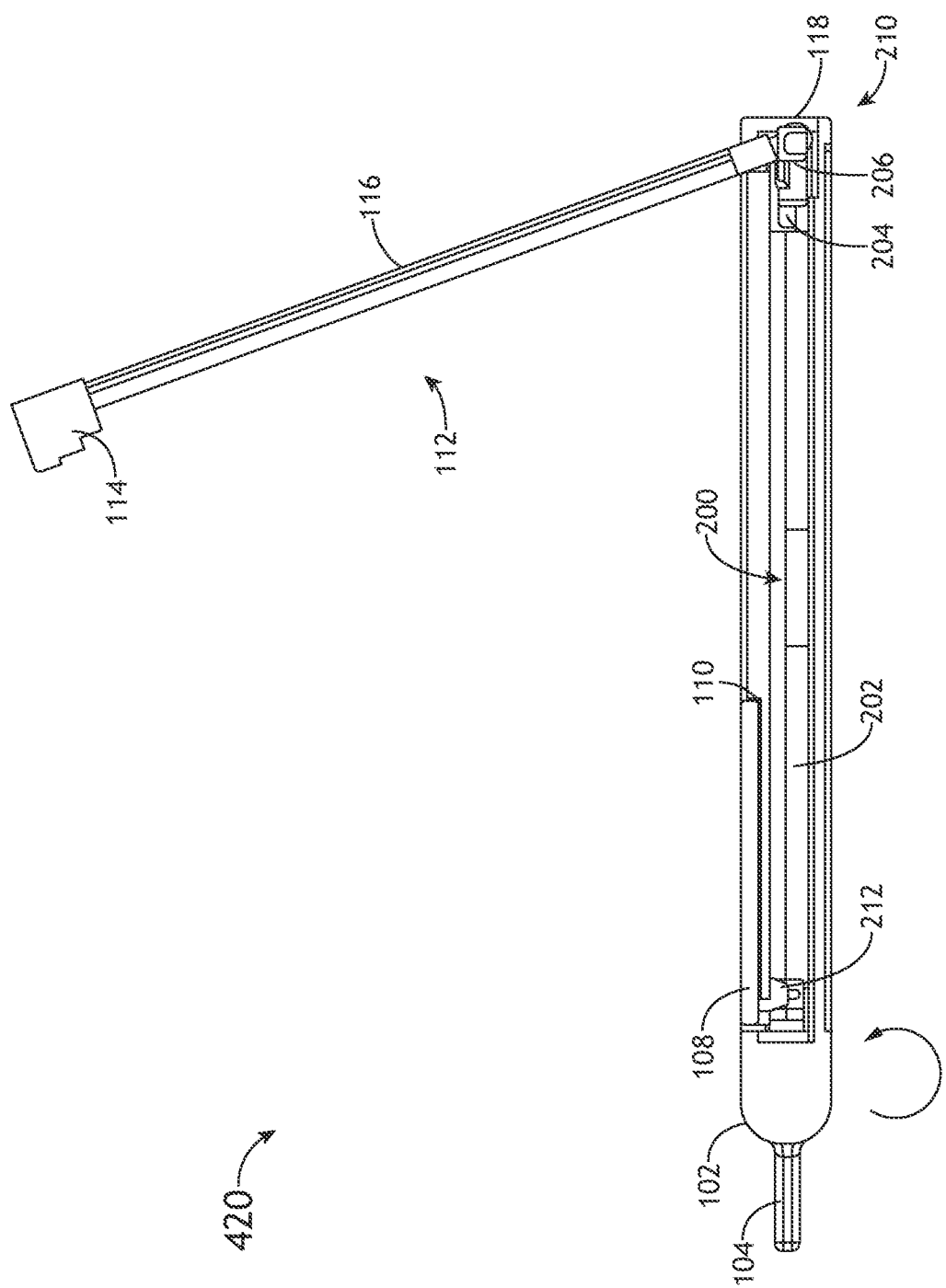
FIG. 4C illustrates a side view of an aircraft tray table with a magnification lens, in accordance with one or more embodiments of the disclosure.

In a state 320 as illustrated in FIG. 3C and a state 420 as illustrated in FIG. 4C, the magnification lens 112 may be in the final lens deployed position and the PED support 108 may be in the support stowed position.

The magnification lens 112 may actuate between the intermediate lens deployed position and the final lens deployed position. For example, the magnification lens 112 may rotate about an axis through the one or more lens hinges 206 between the intermediate lens deployed position and the final lens deployed position.

Figure 3D:
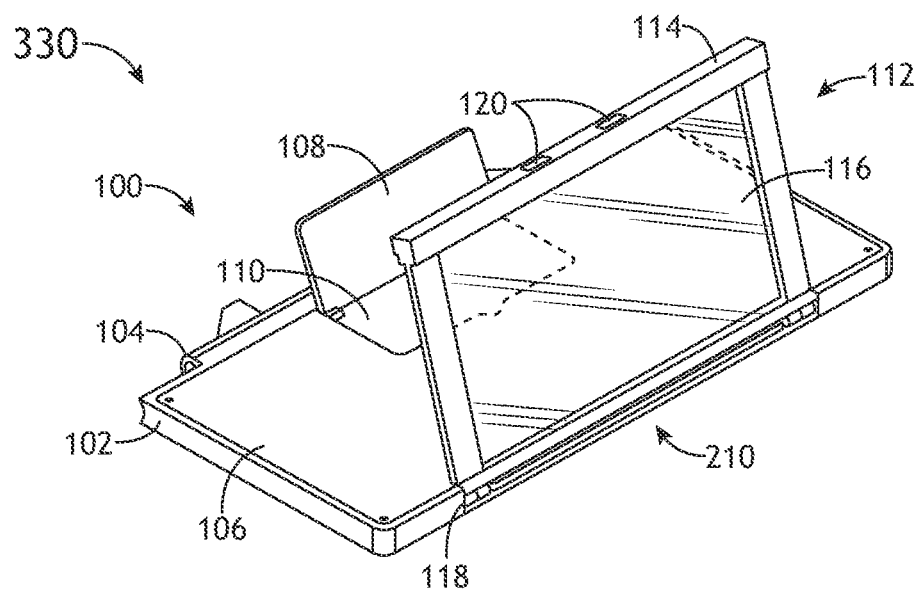
FIG. 3D illustrates a perspective view of an aircraft tray table with a magnification lens, in accordance with one or more embodiments of the disclosure.
Figure 4D:
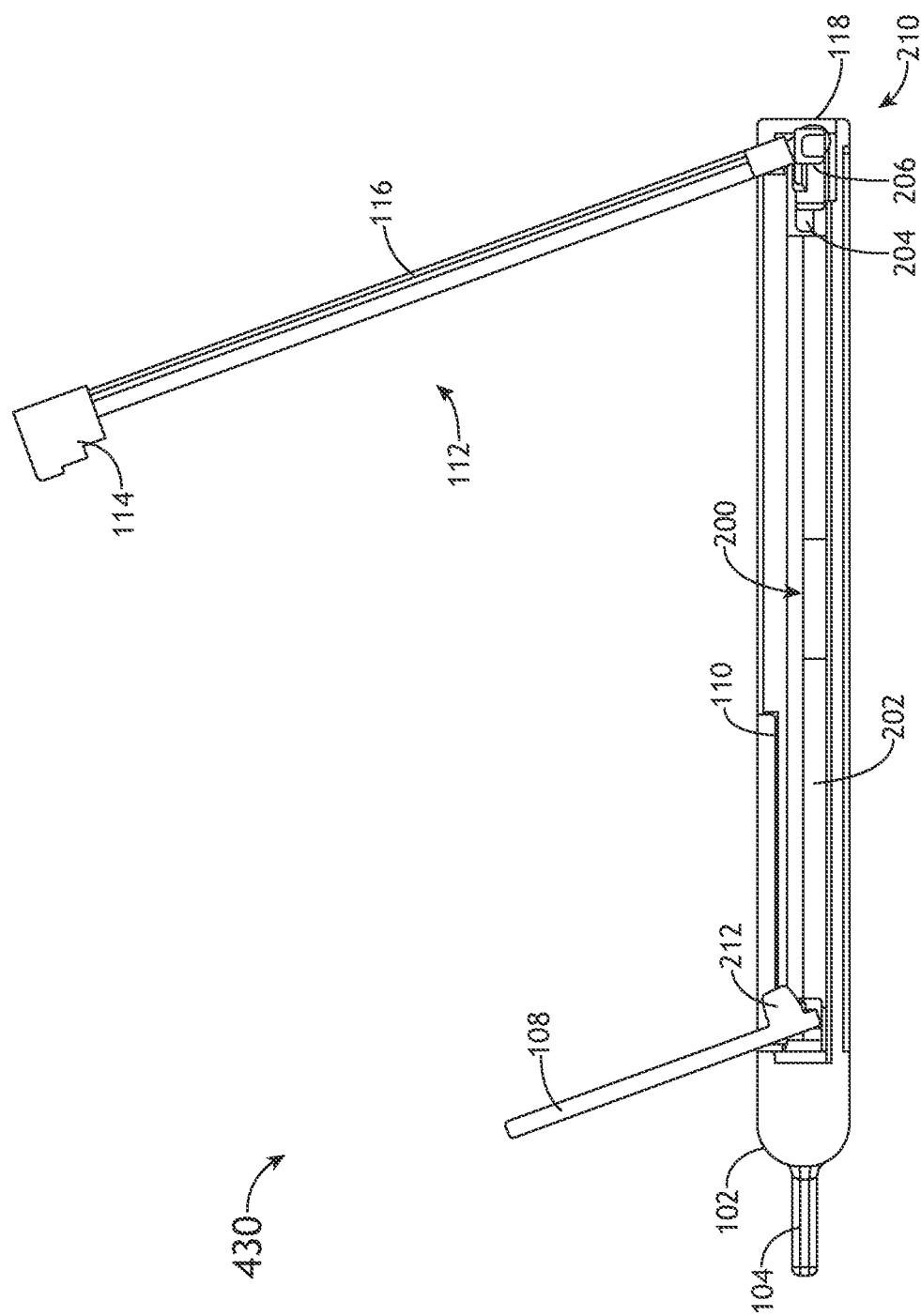
FIG. 4D illustrates a side view of an aircraft tray table with a magnification lens, in accordance with one or more embodiments of the disclosure.

In a state 330 as illustrated in FIG. 3D and a state 430 as illustrated in FIG. 4D, the magnification lens 112 may be in the final deployed position and the PED support 108 may be in a support deployed position.

The PED support 108 may actuate between the support stowed position and the support deployed position. For example, the PED support 108 may rotate about an axis through the one or more support hinges 212 between the support stowed position and the support deployed position.

FIGS. 5-7B in general illustrate an aircraft cabin 500 including the tray table 100, in accordance with one or more embodiments of the disclosure.

The tray table 100 may be coupled to a component 502 within the aircraft cabin 500. For example, the component 502 may be a fixed structure (e.g., a fixed leaf) within the aircraft cabin 500.

The tray table 100 may be coupled to the component 502 within the aircraft cabin 500 via one or more tray table hinges 504. The tray table 100 may be coupled to the component 502 within the aircraft cabin 500 via one or more tray arms 508. For example, the one or more tray table hinges 504 may be coupled to the one or more tray arms 508 and to the component 502 within the aircraft cabin 500. It is noted herein, however, that the one or more tray arms 508 may be coupled to the component 502 within the aircraft cabin 500, such that the one or more tray table hinges 504 may not be necessary.

The tray table 100 may be configured to actuate between the tray table stowed position and one or more tray table deployed positions. For example, the one or more tray table deployed positions may include, but are not limited to, a retracted or intermediate tray table deployed position. By way of another example, the one or more tray table deployed positions may include, but are not limited to, an extended or final tray table deployed position.

The tray table 100 may actuate between the tray table stowed position and the intermediate tray table deployed position. For example, the tray table 100 may rotate an angle γ 506 about an axis through the one or more tray hinges 504 between the tray table stowed position and the intermediate tray table deployed position. For instance, the angle γ 506 may range between 0 and 90 degrees between the stowed tray position and the intermediate tray table deployed position.

The tray table 100 may actuate between the intermediate tray table deployed position and the final tray table deployed position. For example, the tray table 100 may translate via the one or more tray arms 508 between the intermediate tray table deployed position and the final tray table deployed position. For instance, the tray table 100 may translate between 0 and 6 inches between the intermediate tray table deployed position and the final tray table deployed position.

When the tray table 100 is in one of the one or more tray table deployed positions, the PED support 108 and/or the magnification lens 112 may be actuated as illustrated in FIGS. 3A-3D and FIGS. 4A-4D.

For example, the PED support 108 may be actuated between the support stowed position and the support deployed position, where the support deployed position is set at a PED angle α 510 relative to the surface 106 of the top plate. For example, the PED angle α 510 may be 115 degrees relative to the surface 106 of the top plate usable by an aircraft passenger.

By way of another example, the magnification lens 112 may be actuated between the lens stowed position and the final lens deployed position, where the lens deployed position is set at a lens angle β 512 relative to the surface 106 of the top plate. For example, the lens angle β 512 may be 115 degrees relative to the surface 106 of the top plate usable by an aircraft passenger.

The tray table 100 may be constructed such that the PED support 108 and the magnification lens 112 may be spaced apart a select distance 514. In one non-limiting example, the PED support 108 and the magnification lens 112 may be separated by a select distance 514 of 7.1 inches. In general, the select distance 514 may be selected to generate a particular magnification of the content displayed on the personal electronic device held by the PED support 108 for the passenger.

It is noted herein that the PED support 108 and the magnification lens 112 may need to be kept parallel to one another to align the centroid of the personal electronic device held by the PED support 108 and the centroid of the magnification lens 112 with the eyes of the passenger to generate a particular magnification of the content displayed on the personal electronic device held by the PED support 108 for the passenger. As such, the support angle α 510 and the lens angle β 512 may need to be complementary to one another (e.g., 115 degrees/115 degrees, as provided in the non-limiting examples above). In addition, it is noted herein that the support angle α 510 and the lens angle β 512 are not limited to 115 degrees, but instead may be set at any angle, to the extent that the viewability of the content being displayed on the personal electronic device and increased in size by the magnification lens 112 is not affected.

Figure 5:
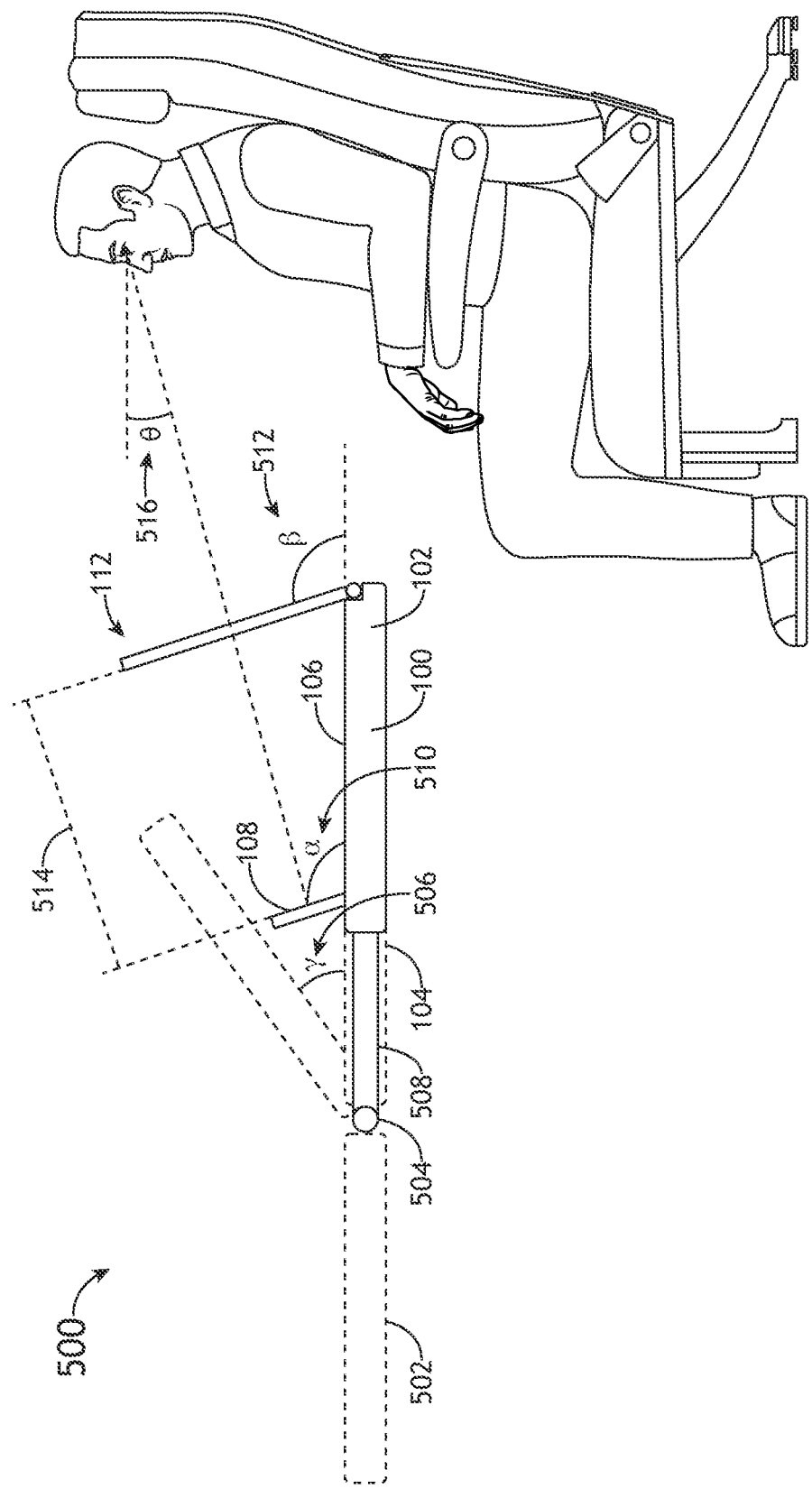
FIG. 5 illustrates an aircraft cabin including an aircraft tray table with a magnification lens, in accordance with one or more embodiments of the disclosure.
Figure 6A:
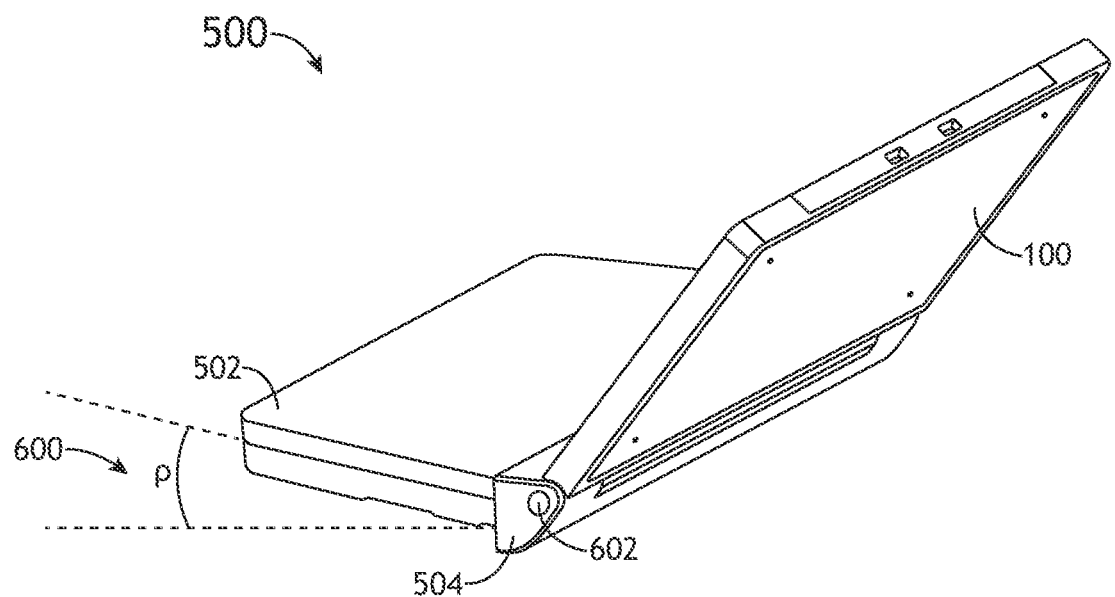
FIG. 6A illustrates a perspective view of an aircraft tray table with a magnification lens, in accordance with one or more embodiments of the disclosure.
Figure 6B:
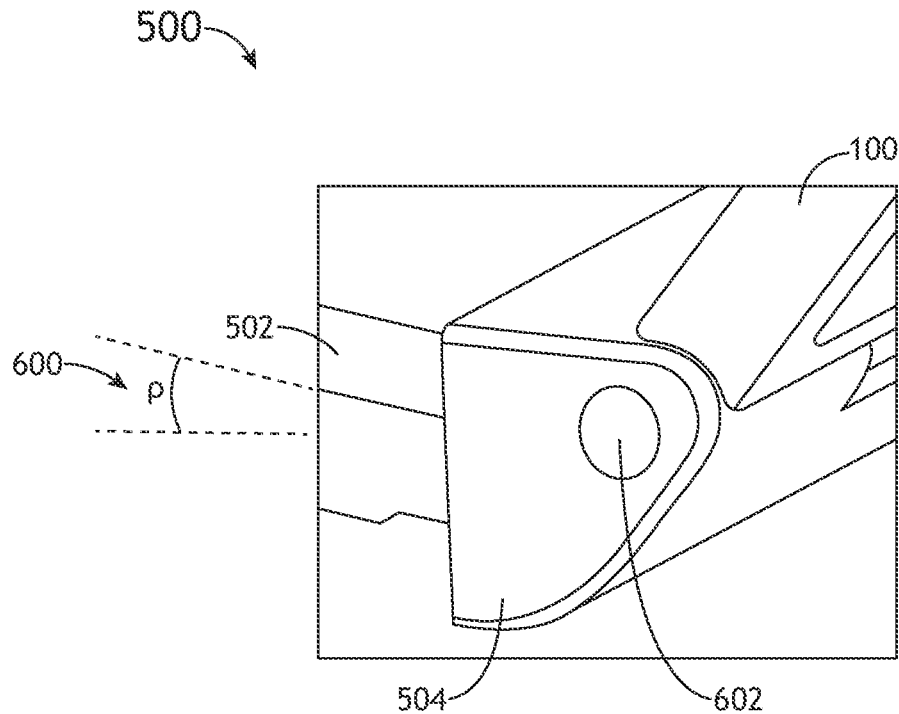
FIG. 6B illustrates a partial perspective view of an aircraft tray table with a magnification lens, in accordance with one or more embodiments of the disclosure.

To accommodate for the need for parallel components set at complementary angles, the passenger may make one or more adjustments. For example, the passenger may adjust a viewing angle θ 516 (e.g., as illustrated in FIG. 5). By way of another example, the passenger may adjust the angle of an aircraft seat the passenger occupies. By way of another example, the passenger may adjust the amount of translation via the one or more tray arms 508 between the intermediate tray table deployed position and the final tray table deployed position.

By way of another example, the passenger may adjust a secondary angle ρ 600 about the axis through the one or more tray hinges 504. For instance, the angle ρ 600 may range between −15 and 15 degrees between the stowed tray position and the intermediate tray table deployed position. The tray table 100 may be configured to actuate between a horizontal deployed position and an angled deployed position within the range of the secondary angle ρ 600 about the axis through the one or more tray hinges 504. The secondary angle ρ 600 may be angled downward in the deployed position to accommodate shorter individuals who may need the tray table 100 pointed downward toward a floor of the aircraft cabin. The secondary angle ρ 600 may be angled upward in the deployed position to accommodate taller and/or larger individuals who may need the tray table 100 pointed upward toward a ceiling of the aircraft cabin.

The one or more tray hinges 504 may include one or more toggles 602. For example, the one or more toggles 602 may include, but are not limited to, one or more buttons, switches, levers, or the like. The one or more toggles 602 may lock or unlock the one or more tray hinges 504 to allow the tray table 100 to rotate within the range of the angle ρ 600 and be freely positioned. The one or more toggles 602 may lock or unlock the one or more tray hinges 504 to allow the tray table 100 to be positioned in increments set by internal mechanical components within the range of the angle ρ 600. In one non-limiting example, the increments may be at 5-degree increments. The one or more tray hinges 504 may include lock detents configured to hold the tray table 100 in place when the one or more toggles 602 are released.

The one or more toggles 602 may lock or unlock the one or more tray hinges 504 to allow the tray table 100 to rotate the secondary angle ρ 600 relative to the component 502 within the aircraft cabin 500. It is noted herein, however, that the toggle 602 in addition or in the alternative may lock or unlock the one or more tray hinges 504 to allow the tray table 100 to rotate the angle γ 506 relative to the component 502 within the aircraft cabin 500 between the tray table stowed position and the intermediate tray table deployed position, such that the secondary angle ρ 600 and the angle γ 506 may fall within a single range of angles. Therefore, the above description should not be interpreted as a limitation on the scope of the disclosure but merely an illustration.

Although embodiments of the disclosure illustrate the independent actuation of the tray table 100, the magnification lens 112, and the PED support 108, it is noted herein the tray table 100 may include one or more linkage assemblies configured to provide simultaneous or near-simultaneous actuation of the tray table 100, the magnification lens 112, and/or the PED support 108. For example, the actuation of the tray table 100 may cause an actuation of the magnification lens 112 and/or the PED support 108. Therefore, the above description should not be interpreted as a limitation on the scope of the disclosure but merely an illustration.

Figure 7A:
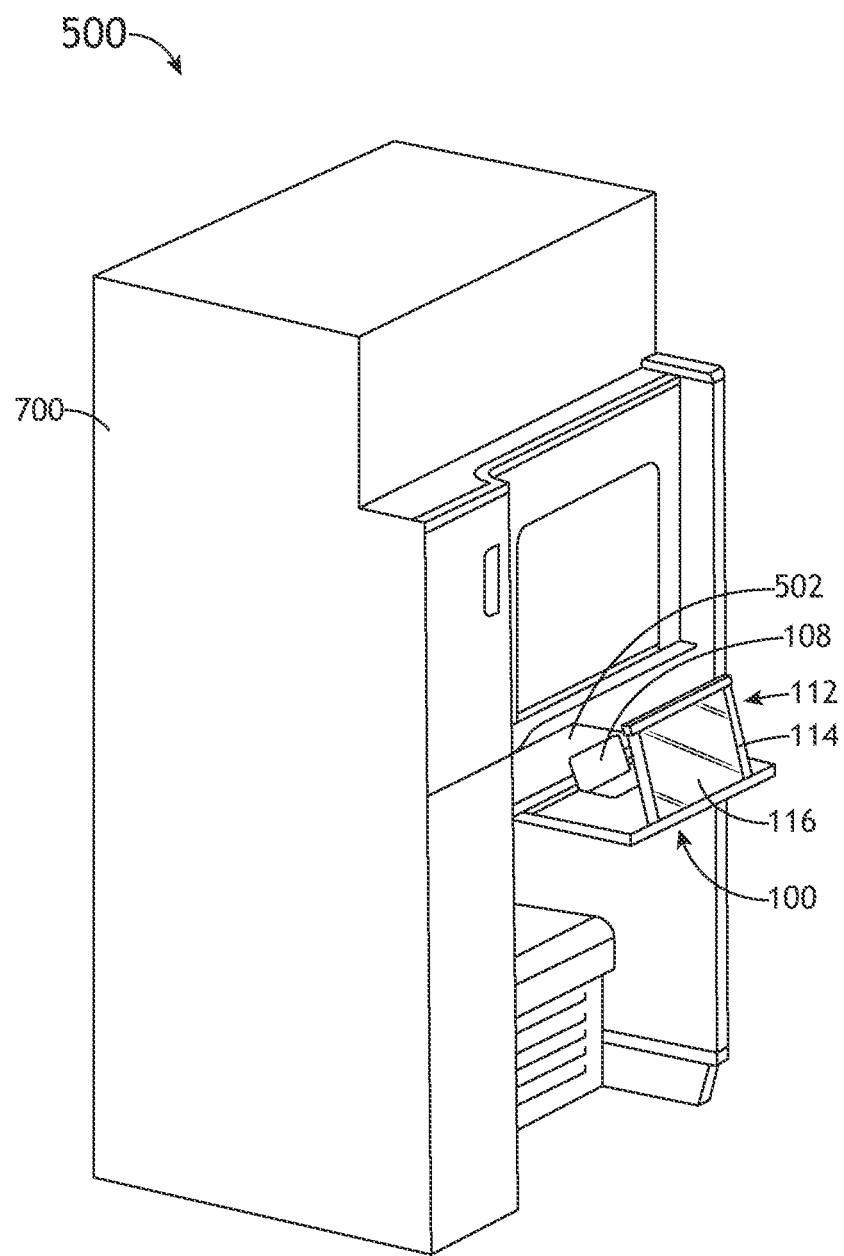
FIG. 7A illustrates a perspective view of an aircraft cabin monument including an aircraft tray table with a magnification lens, in accordance with one or more embodiments of the disclosure.
Figure 7B:
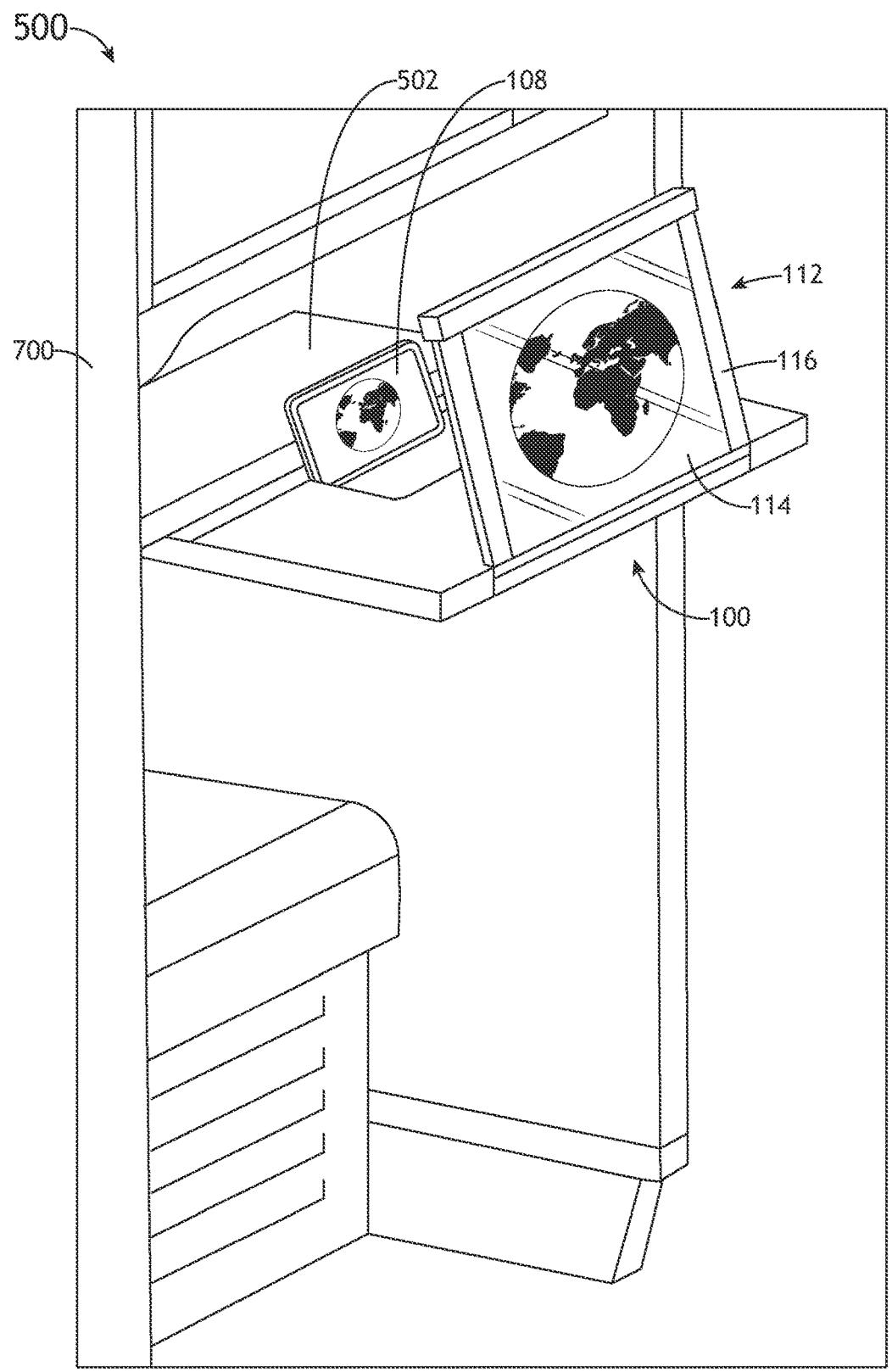
FIG. 7B illustrates a partial perspective view of an aircraft cabin monument including an aircraft tray table with a magnification lens, in accordance with one or more embodiments of the disclosure.

As illustrated in FIGS. 7A and 7B, the component 502 may be installed within a monument 700 of the aircraft cabin 500. For example, the monument 700 may include a front row monument, a class divider, a passenger compartment monument, or other structure within the aircraft cabin 500. It is noted herein, however, that the component 502 may be set within an adjacent aircraft seat or row of aircraft seats within the aircraft cabin 500.

Although embodiments of the disclosure illustrate the magnification lens 112 may be configured to fit within the interior cavity 200, it is noted herein the magnification lens 112 may be configured to stow against and/or within an indentation in an exterior surface of the body 102 when the magnification lens 112 is in the lens stowed position.

FIGS. 8A-8D illustrate perspective views of components of the tray table 100 in various states of actuation from respective stowed positions to deployed positions, in accordance with one or more embodiments of the disclosure. The tray table 100 may be coupled to an aircraft seat 802 via the one or more tray table hinges 504. For example, the tray table 100 may be coupled to the one or more tray arms 508.

Figure 8A:
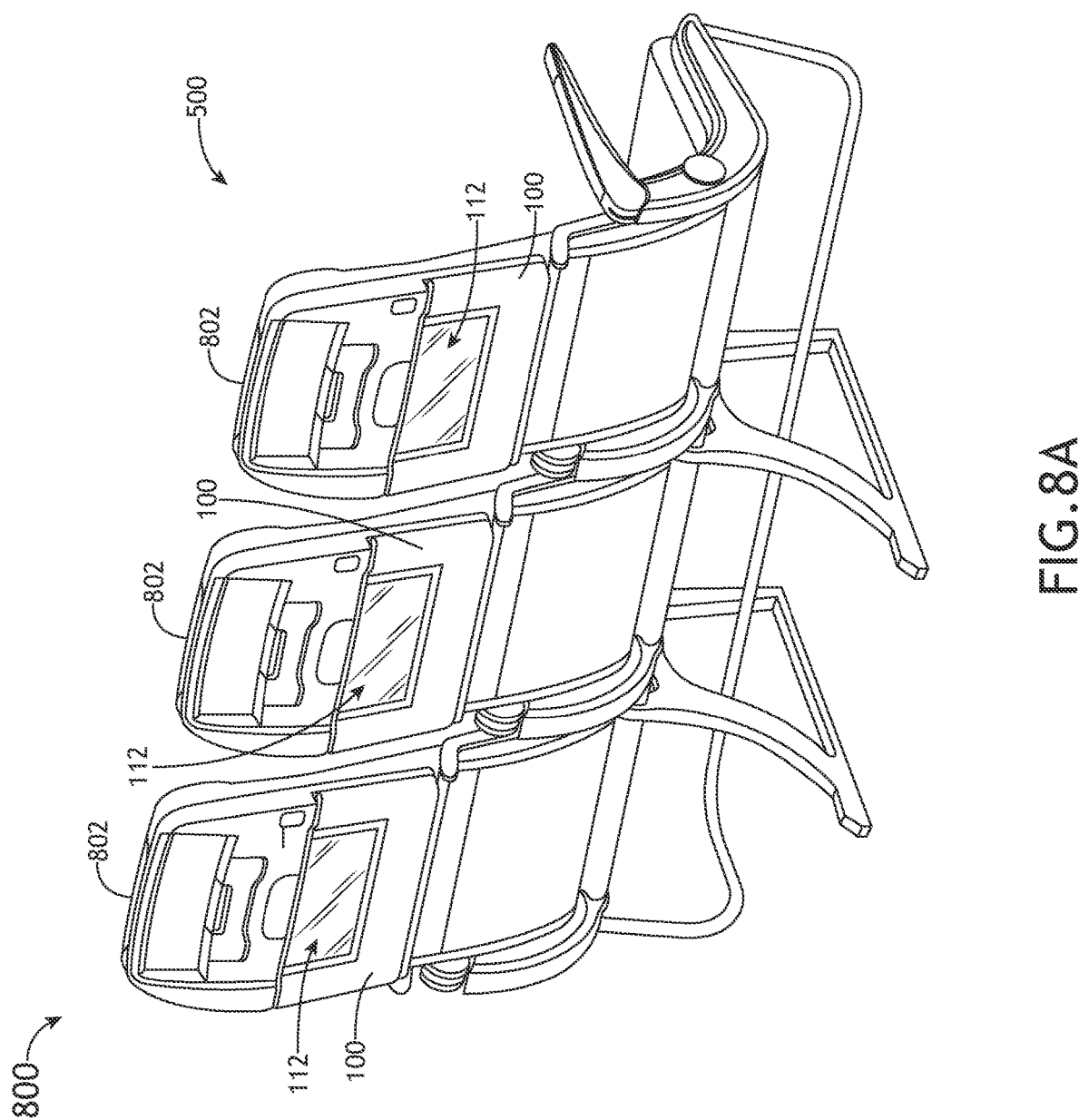
FIG. 8A illustrates a perspective view of a set of aircraft seats, each including an aircraft tray table with a magnification lens, in accordance with one or more embodiments of the disclosure.
Figure 8B:
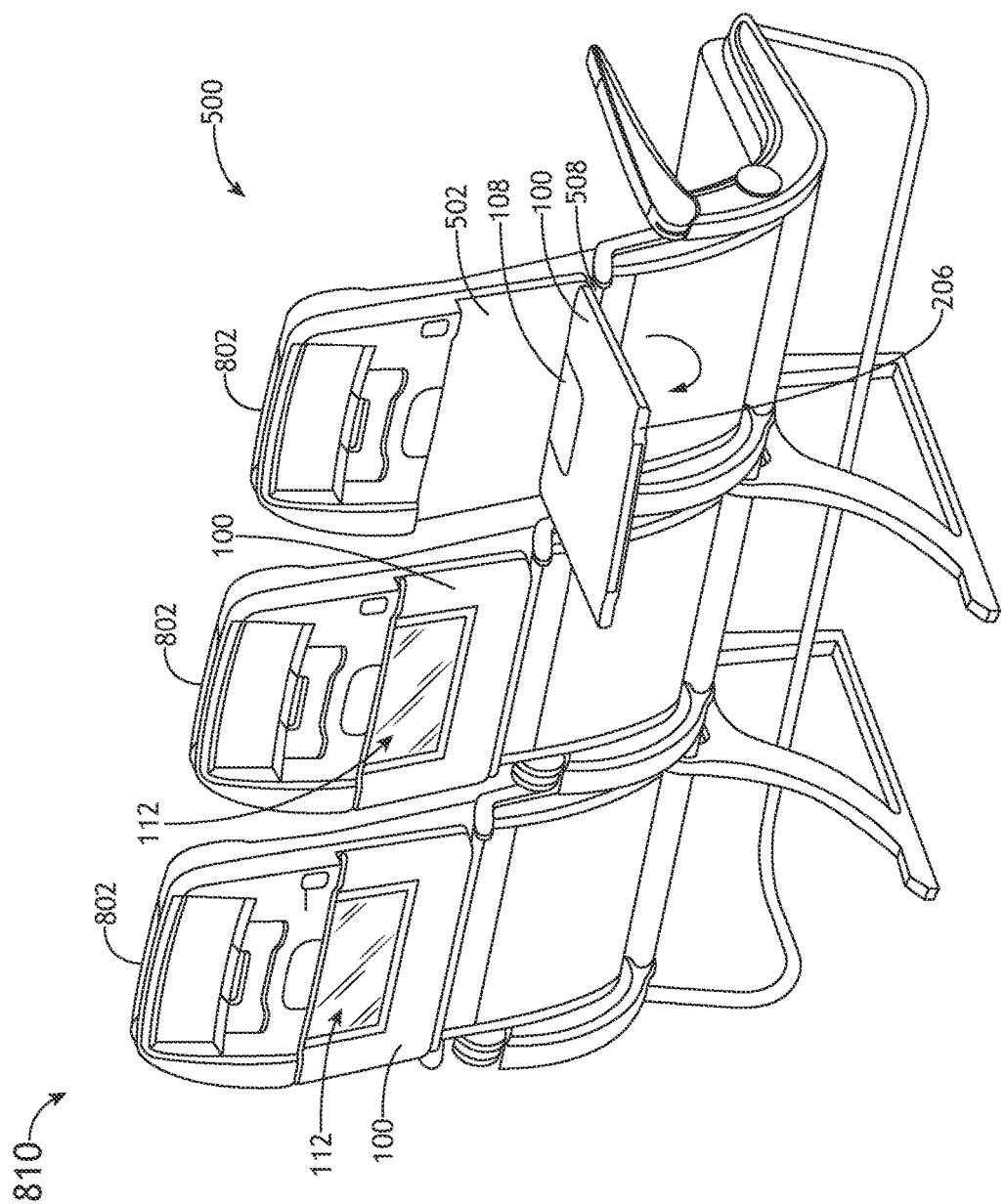
FIG. 8B illustrates a perspective view of a set of aircraft seats, each including an aircraft tray table with a magnification lens, in accordance with one or more embodiments of the disclosure.

In state 800 as illustrated in FIG. 8A, the tray table 100 may be in the tray table stowed position. In state 810 as illustrated in FIG. 8B, the tray table 100 may be in a tray table deployed position.

The magnification lens 112 may be in the lens stowed position. For example, the magnification lens 112 may be configured to stow against and/or within an indentation in an exterior surface 804 of the body 102 when the magnification lens 112 is in the lens stowed position. For instance, the exterior surface 804 may be an outward-facing surface when the tray table 100 is in the tray table stowed position as illustrated in FIG. 8A. In addition, the exterior surface 804 may be a downward-facing surface when the tray table 100 is in the tray table deployed position as illustrated in FIG. 8B.

The PED support 108 may be in the support stowed position. For example, the support stowed position may be against a component 502 of the aircraft seat 802 when the tray table 100 is in the tray table stowed position.

Figure 8C:
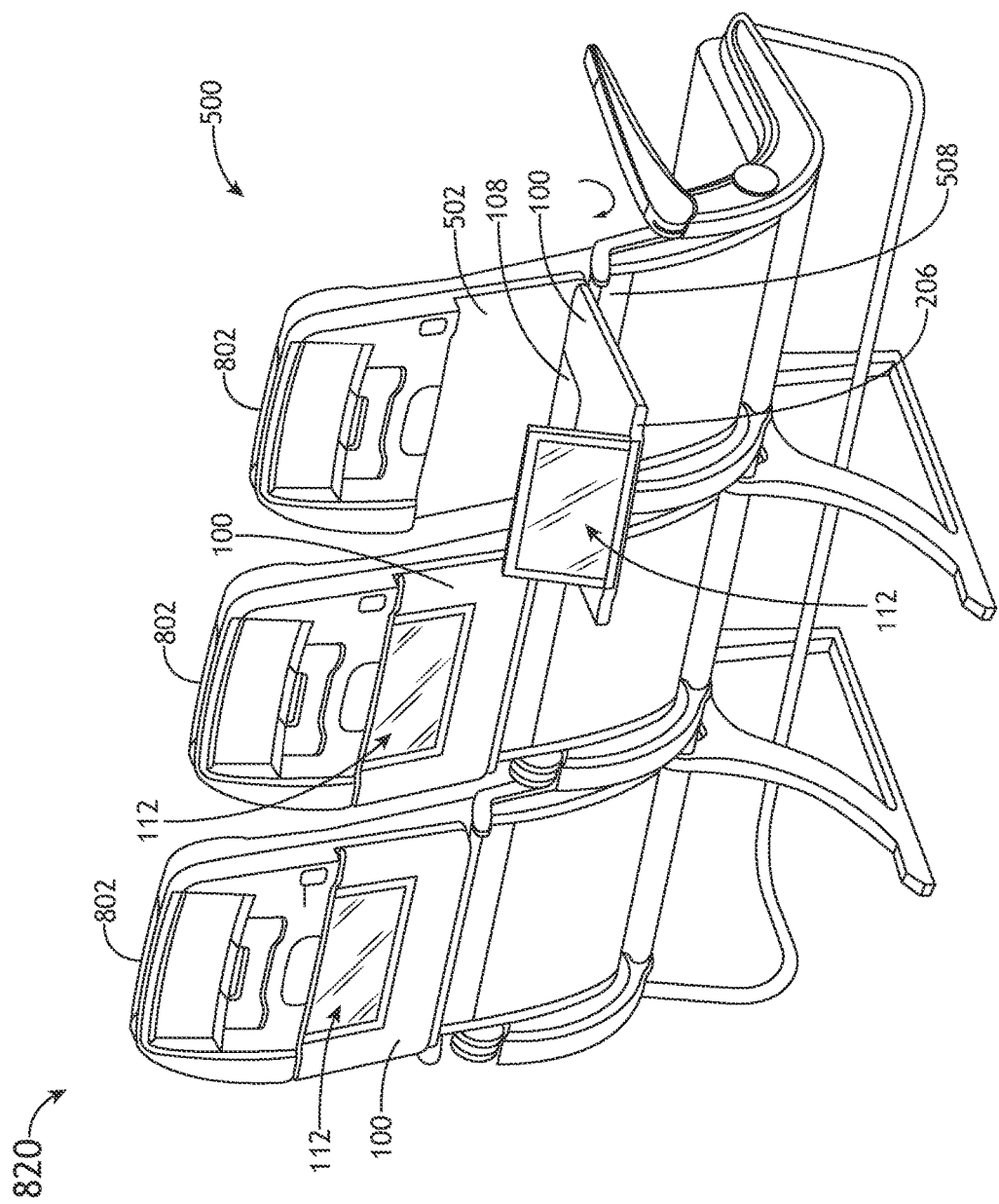
FIG. 8C illustrates a perspective view of a set of aircraft seats, each including an aircraft tray table with a magnification lens, in accordance with one or more embodiments of the disclosure.

In state 820 as illustrated in FIG. 8C, the tray table 100 may be in the tray table deployed position, the magnification lens 112 may be in the lens deployed position, and the PED support 108 may be in the support stowed position.

The magnification lens 112 may actuate between the lens stowed position and the lens deployed position. For example, the magnification lens 112 may rotate about an axis through the one or more lens hinges 206 between the lens stowed position and the lens deployed position.

Figure 8D:
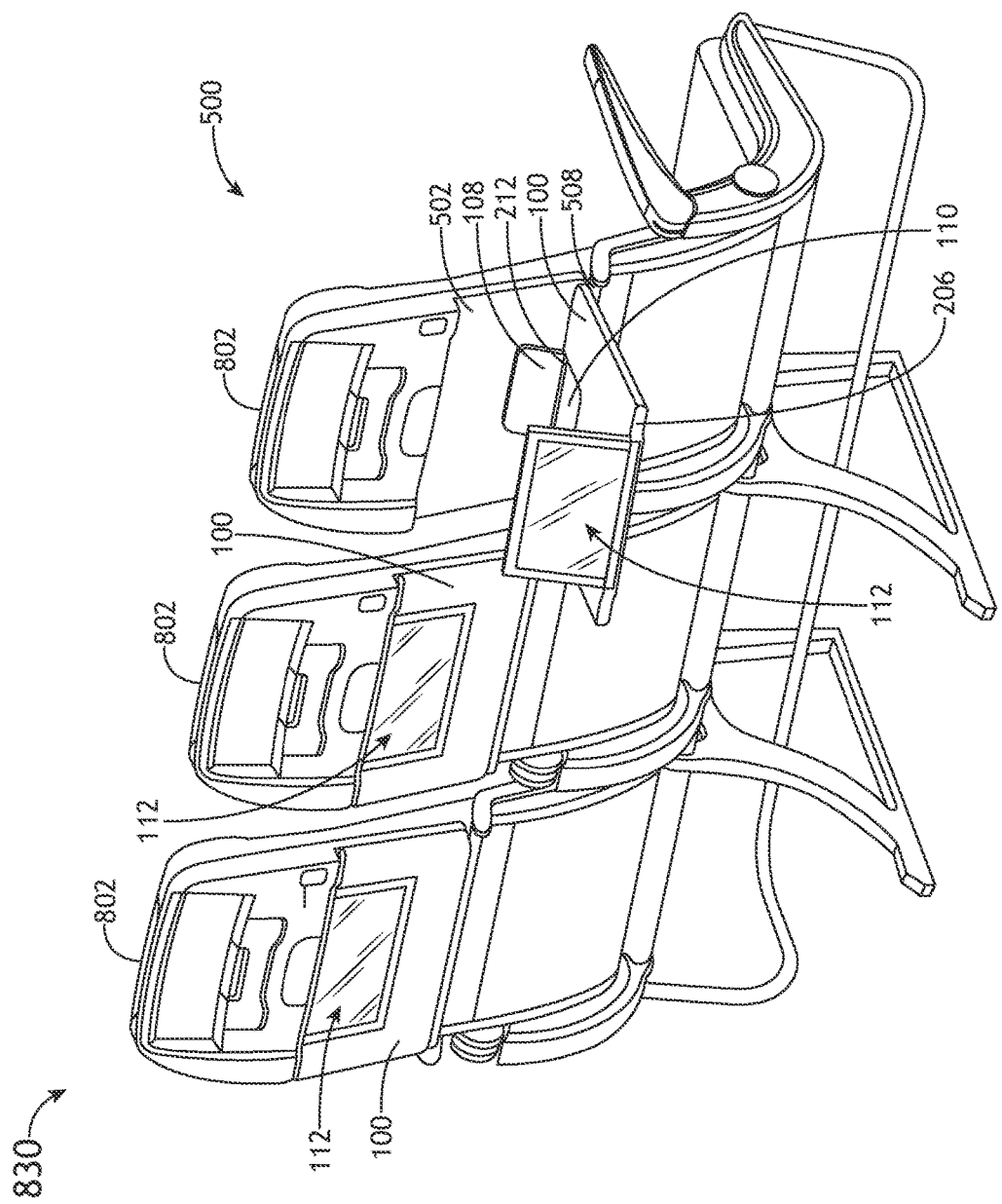
FIG. 8D illustrates a perspective view of a set of aircraft seats, each including an aircraft tray table with a magnification lens, in accordance with one or more embodiments of the disclosure.

In state 830 as illustrated in FIG. 8D, the tray table 100 may be in the tray table deployed position, the magnification lens 112 may be in the lens deployed position, and the PED support 108 may be in the support deployed position.

The PED support 108 may actuate between the support stowed position and the support deployed position. For example, the PED support 108 may rotate about an axis through the one or more support hinges 212 between the support stowed position and the support deployed position.

It is noted herein that to accommodate the configuration illustrated in FIGS. 8A-8D, various components of the tray table 100 may be re-configured to allow for actuation of the magnification lens 112 between the lens stowed position and the lens deployed position.

Although embodiments of the disclosure illustrate actuating the magnification lens 112 prior to actuating the PED support 108 (e.g., as illustrated in FIGS. 3A-3D, 4A-4D, and 8A-8D), it is noted herein the PED support 108 may instead be actuated prior to actuating the magnification lens 112. Therefore, the above description should not be interpreted as a limitation on the scope of the disclosure but merely an illustration.

Although embodiments of the disclosure illustrate an independent actuation of the magnification lens 112 and the PED support 108 (e.g., as illustrated in FIGS. 3A-3D, 4A-4D, and 8A-8D), it is noted herein the magnification lens 112 and the PED support 108 may be simultaneously or near-simultaneously actuated. In addition, it is noted herein the tray table 100 may include one or more linkage assemblies configured to provide simultaneous or near-simultaneous actuation of the magnification lens 112 and the PED support 108. For example, the actuation of either the magnification lens 112 or the PED support 108 may cause an actuation of the other component. Therefore, the above description should not be interpreted as a limitation on the scope of the disclosure but merely an illustration.

Although embodiments of the disclosure illustrate an actuation from respective stowed positions to respective various deployed positions for the various components of the tray table 100, it is noted herein similar motions may occur in reverse between the respective various deployed positions and the respective stowed positions for the various components of the tray table 100. Therefore, the above description should not be interpreted as a limitation on the scope of the disclosure but merely an illustration.

It is noted herein the tray table 100 may include any electrical connections necessary to receive power and provide charging or other electrical connectivity options to a personal electronic device supported by the PED support 108. For example, the body 102 (e.g., the indentation 110) may include charging ports and/or charging cables configured to extract and retract into the cavity 200 of the body 102. By way of another example, the PED support 108 may include inductive charging components.

In this regard, the magnification lens 112 of the aircraft tray table 100 may be capable of increasing the size of the content being displayed on the personal electronic device for easier viewing by the aircraft passenger. In addition, the PED support 108 of the aircraft tray table 100 may be capable of supporting a personal electronic device at a select viewing angle when the size of the content being displayed on the personal electronic device is increased for easier viewing by the aircraft passenger.

Aircraft tray tables 100 including the magnification lens 112 installed within an avionics environment may be configured in accordance with aviation guidelines and/or standards put forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), the Society of Automotive Engineers (SAE), or any other standards setting organization or company; the Radio Technical Commission for Aeronautics (RTCA) or any other guidelines agency or organization; or the like.

Although embodiments of the disclosure are directed to an avionics environment, it is noted herein the aircraft tray table 100 including the magnification lens 112 is not limited to the avionics environment and/or the aircraft components within the avionics environment. For example, the aircraft tray table 100 including the magnification lens 112 may be configured to operate in any type of vehicle known in the art. For example, the vehicle may be any air, space, land, or water-based personal equipment or vehicle; any air, space, land, or water-based commercial equipment or vehicle; any air, space, land, or water-based military equipment or vehicle known in the art. For instance, the vehicle may include an automobile. By way of another example, the aircraft tray table 100 including the magnification lens 112 may be coupled to and/or configured to operate with an apparatus sold for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft tray table, comprising:
    a body including a defined interior cavity and one or more mount points integrated within a rear surface of the body;
    a personal electronic device support coupled to the body, the personal electronic device support configured to be actuated between a support stowed position and a support deployed position via one or more support hinges, the personal electronic device support configured to hold a personal electronic device when the personal electronic device support is in the support deployed position;
    a magnification lens configured to actuate between a lens stowed position, an intermediate lens deployed position, and a final lens deployed position, the magnification lens configured to fit within the interior cavity when the magnification lens is in the lens stowed position, the magnification lens comprising a lens element configured to magnify content displayed on the personal electronic device when the magnification lens is in the final lens deployed position, the magnification lens comprising a lens frame configured to hold the lens element;
    a lens actuation assembly within the interior cavity, the lens actuation assembly comprising:
        one or more carriages coupled to one or more rails, the one or more carriages configured to actuate the magnification lens along the one or more rails between the lens stowed position and the intermediate lens deployed position; and
        one or more lens hinges coupled to the one or more carriages and to the lens frame, the one or more lens hinges configured to actuate the magnification lens between the intermediate lens deployed position and the final lens deployed position,
    the personal electronic device support being set at a first angle relative to a surface of the body when the personal electronic device support is in the support deployed position,
    the magnification lens being set at a second angle relative to the surface of the body when the magnification lens is in the lens deployed position,
    the first angle and the second angle being selected so the personal electronic device support and the magnification lens are parallel;
    one or more tray hinges configured to couple to the one or more mount points, the aircraft tray table configured to rotate between a tray table stowed position and a tray table deployed position about an axis through the one or more tray hinges;
    one or more lock detents configured to hold the aircraft tray table in the tray table stowed position, the one or more lock detents being set within the lens frame.

2. The aircraft tray table of claim 1, the aircraft tray table configured to rotate between a horizontal deployed position and an angled deployed position about an axis through the one or more tray hinges.

3. The aircraft tray table of claim 1, the one or more tray hinges including at least one toggle configured to allow for a rotation about an axis through the one or more tray hinges.

4. The aircraft tray table of claim 1, the one or more lock detents being set within an exterior surface of the lens frame.

5. The aircraft tray table of claim 1, the one or more carriages including two carriages, the lens actuation assembly comprising:
    a linkage coupled to the two carriages, the linkage configured to cause the two carriages to actuate simultaneously when the magnification lens is actuated between the lens stowed position and the intermediate lens deployed position.

6. The aircraft tray table of claim 1, the personal electronic device support configured to fit within an indentation in the surface of the body when the personal electronic device support is in the support stowed position.

7. The aircraft tray table of claim 6, a surface of the personal electronic device support being flush with the surface of the body when the personal electronic device support is in the support stowed position.

8. The aircraft tray table of claim 1, a centroid of the magnification lens and a centroid of the personal electronic device being aligned when the magnification lens is in the final lens deployed position and the personal electronic device is held by the personal electronic device support when the personal electronic device support is in the support deployed position.

9. The aircraft tray table of claim 1, an amount of magnification of the content displayed on the personal electronic device when the magnification lens is in the final lens deployed position being dependent on a distance between the personal electronic device support and the magnification lens.

* * * * *